United States Patent [19]
Radley et al.

[11] Patent Number: 5,886,892
[45] Date of Patent: Mar. 23, 1999

[54] POWER SUPPLY WITH IMPROVED INRUSH CIRCUIT FOR LIMITING INRUSH CURRENT

[75] Inventors: Thomas G. Radley, Chula Vista; Daniel A. Sebald, Encinitas, both of Calif.

[73] Assignee: Hewlett-Packard Company, Palo Alto, Calif.

[21] Appl. No.: 986,372

[22] Filed: Dec. 5, 1997

[51] Int. Cl.$^6$ .............................. H02M 7/06; H02M 7/04; G05F 5/00

[52] U.S. Cl. ......................... 363/126; 363/143; 323/908; 323/300

[58] Field of Search ................................. 363/45, 46, 85, 363/126, 61, 143; 323/908, 300

[56] References Cited

U.S. PATENT DOCUMENTS

| | | | |
|---|---|---|---|
| 4,268,899 | 5/1981 | Rokas | 363/61 |
| 4,608,500 | 8/1986 | Togawa | 363/126 |
| 4,783,729 | 11/1988 | Konopka | 363/143 |
| 4,805,083 | 2/1989 | Konopka | 363/143 |
| 4,933,832 | 6/1990 | Schneider et al. | 363/143 |
| 5,097,402 | 3/1992 | Kriz et al. | 363/61 |
| 5,162,984 | 11/1992 | Castagnet et al. | 363/61 |
| 5,287,263 | 2/1994 | Shilo | 363/143 |
| 5,572,415 | 11/1996 | Mohan | 363/126 |
| 5,619,127 | 4/1997 | Warizaya | 323/908 |
| 5,654,884 | 8/1997 | Mohan | 363/126 |
| 5,661,348 | 8/1997 | Brown | 363/126 |
| 5,793,626 | 8/1998 | Jiang | 363/126 |

OTHER PUBLICATIONS

Delta Electronics, Inc. Part No. PK220FP-1 DC-DC Convertor & PWM, Protection Switching Power Supply Schematic dated Sep. 30, 1996 with attached E-mail message dated Nov. 11,, 1997 from Flora Cheng to Jennifer Geer regarding the power supply operation.

Delta Electronics, Inc. Switching Power Supply Schematic dated Aug. 30, 1996, Part No. DPS-35DP, DC-323, PK35DP.

Power Supply Schematic dated Oct. 17, 1997.

*Primary Examiner*—Peter S. Wong
*Assistant Examiner*—Bao Q. Vu
*Attorney, Agent, or Firm*—Jerry R. Potts

[57] ABSTRACT

A new and improved rectifier power supply operates in a low voltage mode of operation and a high voltage mode of operation without user intervention and includes an inrush current limiting device that is in circuit during a predetermined period of time during start up and bypassed during steady state operation in the low voltage mode of operation. In the high voltage mode of operation, when inrush current is reduced relative to the low voltage mode of operation, the inrush limiting device always remains in circuit. As there is no power loss associated with the inrush limiting device in the steady state low voltage mode of operation, the power supply has an improved efficiency and reliability and a reduced cost as it can be rated for continuous operation only in the high voltage mode of operation when the input current is lowest and device dissipation is least.

21 Claims, 1 Drawing Sheet

5,886,892

POWER SUPPLY WITH IMPROVED INRUSH CIRCUIT FOR LIMITING INRUSH CURRENT

BACKGROUND OF THE INVENTION

1. Field of the Invention

The present invention relates to power supplies and more particularly relates to a rectifier power supply having an improved inrush circuit that limits cold start inrush currents while maximizing efficiency by substantially reducing steady state losses.

2. Description of the Prior Art

Modem electrical equipment marketed internationally must include either an internal or external power supply that is able to operate with any given countries adopted line voltage standard without special switches or user intervention. In this regard, the power supply must operate with voltages that range between about 85 $VAC_{rms}$ and about 264 $VAC_{rms}$.

Most, if not all, conventional power supplies that meet this need include in-line current limiting circuitry to protect the energized equipment from unwanted and undesired transient voltage and current surges that typically occur at power up times. Such in-line current limiting circuitry is generally expensive to manufacture, and is inefficient due to the dissipation of large amounts of power through the high wattage rated current limiting devices associated with such circuitry.

Therefore it would be highly desirable to have a new and improved power supply that is highly efficient and that operates without user intervention with the various world standard AC line voltages. Such a new and improved power supply should also be relatively inexpensive to manufacture, and should at least meet or exceed the International Electrotechnical Commission (IEC) adopted standards relative to limiting input current harmonics, and reducing flicker.

SUMMARY OF THE INVENTION

In a preferred embodiment of the present invention, a power supply operates in a low voltage mode and a high voltage mode without user intervention. The power supply includes an inrush current limiting device that is in circuit during a predetermined period of time during start up and bypassed during steady state operation in the low voltage mode of operation. In the high voltage mode of operation, when steady state current is reduced relative to the low voltage mode of operation, the inrush-limiting device always remains in circuit. As there is no power loss associated with the inrush-limiting device in the steady state low voltage mode of operation, the power supply has an improved efficiency and reliability. Moreover as the power supply can be rated for continuous operation only in the high voltage mode of operation when the input current is lowest and device power dissipation is least, it has a reduced cost.

In another embodiment of the present invention a novel method of improving power supply efficiency includes a two step process: 1) limiting inrush current for a predetermined period of time during a power up condition using an inrush current limiting device; and 2) bypassing the inrush current limiting device at the end of the predetermined period of time. In this manner, the inrush current limiting device dissipates substantially no power under steady state operating conditions in a low voltage mode of operation and remains in circuit under a high voltage mode of operation to help reduce flicker and limit input current harmonics.

DESCRIPTION OF THE DRAWINGS

The above mentioned advantages and features of the present invention and the manner of attaining them will become apparent, and the invention itself will be best understood by reference to the following description of the preferred embodiment of the invention, in conjunction with the accompanying drawings, wherein.

DESCRIPTION OF THE PREFERRED EMBODIMENT

Figure 1:
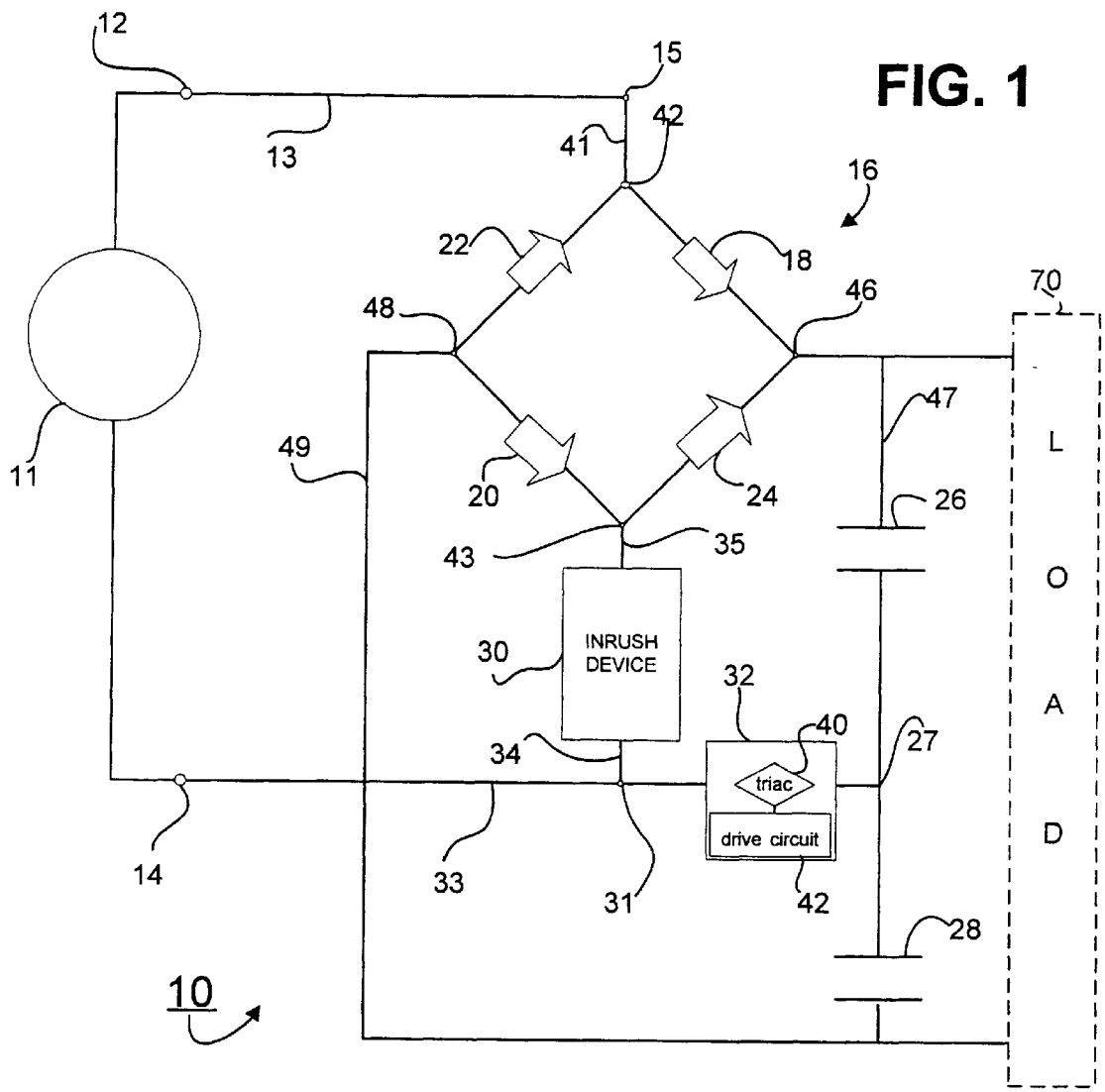
FIG. 1 is a simplified schematic diagram of a power supply which is constructed in accordance with the preferred embodiment of the present invention.

Referring now to the drawings and more particularly to FIG. 1 thereof, there is shown a new and improved power supply 10 that is constructed in accordance with the preferred embodiment of the present invention. The power supply 10 is a rectifier power supply that operates over two separate and distinct AC line voltage ranges. In one mode of operation, the power supply 10 rectifies an AC line voltage that is between about 85 $VAC_{rms}$ and about 140 $VAC_{rms}$. In the other mode of operation, the power supply 10 rectifies an AC line voltage that is between about 180 $VAC_{rms}$ and about 264 $VAC_{rms}$. As will be explained hereinafter in greater detail, the power supply 10 is utilized to provide power, for example, to an inverter of a switching power supply or a direct current device from the above-mentioned international AC line voltage standards with increased efficiency and reliability, while helping to meet the IEC standards relating to limiting input current harmonics and reducing flicker.

The power supply 10 generally comprises a pair of series connected capacitors 26 and 28 respectively, that maintain a predetermined charge when energized with electrical energy. In this regard, the capacitors 26 and 28 that are interconnected at a common node 27 store a charge of a sufficient potential to supply a load 70, such as an inverter with electrical energy.

A diode bridge rectifier 16 having a line potential terminal or node 42 and a neutral potential terminal or node 43 is coupled between the series connected capacitors 26 and 28 via a pair of internal terminals or nodes 46 and 48 respectively by associated conductors 47 and 49 respectively.

As best seen in FIG. 1, the power supply 10 also includes a pair of AC input power terminals 12 and 14 that are adapted to be connected to an external AC power source, such as the AC power source 11. In the preferred embodiment of the present invention, the input power terminal 12 is an AC line terminal while the input power terminal 14 is an AC neutral terminal. Those skilled in the art will understand, however, that line and neutral terminals are defined relative to the source 11.

As noted above, the potential of the power source 11 can be in a range of between about 85 $VAC_{rms}$ and about 264 $VAC_{rms}$. In this regard, in a low voltage mode of operation, the power source 11 supplies low voltage at between about 85 $VAC_{rms}$ and about 140 $VAC_{rms}$. In a high voltage mode of operation, the power source 11 supplies a high voltage at between about 180 $VAC_{rms}$ and about 264 $VAC_{rms}$.

In order to supply the power supply 10 with positive current during the positive and negative AC voltage cycles, the AC power terminals 12 and 14 of the voltage source 11 are coupled to a pair of internal power supply power terminals 15 and 31 respectively without the use of any current limiting device. In this regard, the line input terminal 42 of the bridge rectifier 16 is connected to the AC line power terminal 12 via the internal terminal 15 and a pair of in-line power conductors 13 and 41 respectively. In a like manner the neutral input terminal 31 is connected to the AC neutral power terminal 14 via a power conductor 33. In a similar manner, the neutral potential input terminal 43 of the bridge rectifier 16 is coupled to the AC neutral input power terminal 14 via the power conductor 33.

To facilitate current limiting during a powering up condition, the power supply 10 also includes an inrush-limiting device 30 having a pair of associated conductors 34 and 35 respectively. As will be explained hereinafter in greater detail, the inrush limiting device 30 is always in circuit during cold start up periods, but is bypassed automatically in the steady state low voltage mode of operation.

In order to bypass the inrush-limiting device 30 during the steady state low voltage mode of operation, the power supply 10 further includes a triac auto ranging circuit 32. The triac circuit 32 is coupled between a common node 27 between capacitors 26 and 28 and a common node 31 between the input terminal 14 via the conductor 33 and the inrush limiting device 30. The triac auto ranging circuit 32 is conventional and well known to those skilled in the art and will not be described hereinafter in greater detail except as is necessary to facilitate a better understanding of the preferred embodiment of the present invention.

As will be explained in greater detail, in the low voltage mode of operation when the inrush current is highest, the triac circuit 32 functions as an open circuit for a predetermined period of time during power up conditions and as a short circuit during steady state operation. In the high voltage mode of operation when the steady state current is lowest, the triac circuit 32 acts only as an open circuit for both steady state and power up conditions.

Considering now the bridge rectifier 16 in greater detail with reference to FIG. 1, the bridge rectifier 16 has a conventional four-diode construction that includes diodes 18, 20, 22, and 24. Diode 18 has its anode connected to the cathode of diode 22 through the common line potential node 42 that is coupled to the AC line power input terminal 12 via the conductor 13.

The cathode of diode 18 is connected to the cathode of diode 24 through the common internal node 46 that is coupled to the capacitor 26 via the conductor 47. The anode of diode 24 is connected to the cathode of diode 20 through the common neutral potential node 43 that is coupled to the inrush limiting device 30 via its conductor 35. The anodes of diodes 20 and 22 are connected together through the common internal node 48 that is coupled to the capacitor 28 via the conductor 49.

A. Low Voltage Mode of Operation

1. Initial Power on Condition

Figure 2:
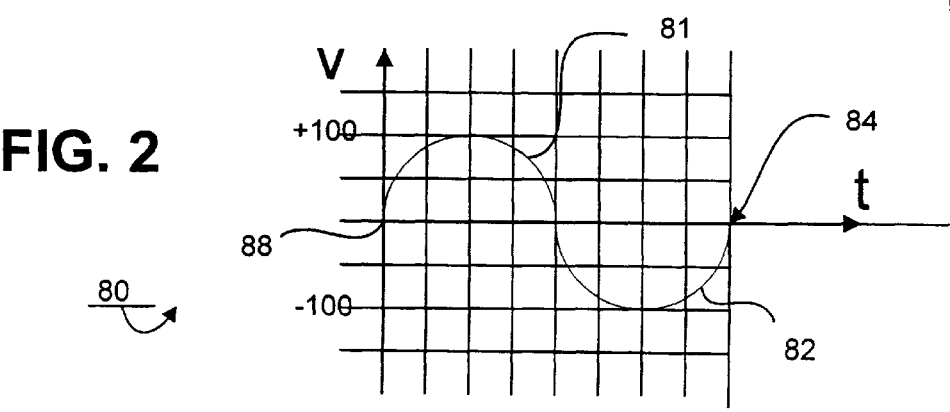
FIG. 2 is a diagrammatic representation of a sinusoidal line voltage applied to the power supply of FIG. 1.

Considering now the initial power on condition in the low voltage mode of operation, just prior to a voltage being applied to the power supply 10, the AC line voltage at its input terminals 12 and 14 respectively is about zero volt, which is indicated generally at 88 (FIG. 2). When an AC low voltage is initially applied across the input terminals 12 and 14, such as a low voltage sinusoidal waveform 81 indicated by the diagrammatic representation 80, the triac circuit 32 is inactive and acts as an open circuit. In this regard, when a positive potential is applied to the input terminal 12, positive current flows from the input terminal 12 through diode 18, capacitors 26 and 28 in series, diode 20, the inrush limiting device 30 and back to the input terminal 14 of the power source 11.

With reverse polarity indicated generally at 82 (FIG. 2), positive current flow is from the input terminal 14 to the inrush limiting device 30, diode 24, capacitors 26 and 28 in series, diode 22, and back to input terminal 12. Thus the peak voltage across the capacitors 26 and 28 is the peak of the AC voltage applied to the input terminal 12 and 14.

As an example of operation, at about the end of the first AC line voltage cycle, when the AC voltage applied across the input terminals 12 and 14 is at about zero volts as indicated generally at 84 (FIG. 2), the triac circuit 32 is activated. When the triac circuit 32 is activated it functions as a short circuit between the input terminal 14 and the common node connection 27 between the capacitors 26 and 28. The triac circuit 32 then remains activated until the AC line voltage is interrupted from the power supply 10. During this steady state mode of operation, the inrush-limiting device 30 is bypassed from the input current. Thus, although the inrush limiting device 30 will limit inrush current each time the AC line voltage is interrupted, the device 30 is not dissipating power during steady state operation and remains substantially at ambient temperature.

From the foregoing, those skilled in the art will understand that the inrush limiting device 30 limits the instantaneous peak charging current of the in series capacitors 26 and 28 respectively.

Although in the preferred embodiment of the present invention, the triac circuit 32 is described as switching when the applied AC line voltage is at about zero volts, those skilled in the art will understand that switching may take place at other line voltages, such as at a line voltage substantially less than about 50% of the peak applied voltage.

2. Steady State Low Voltage Operation

Considering now the steady state operation of the power supply 10 in the low voltage mode of operation with reference to FIGS. 1 and 2, when the triac circuit 32 is activated, for example, at the end of the first full AC line voltage cycle, a positive potential is applied to the input terminal 12 that current flow from the input terminal 12 through diode 18, capacitor 26, triac circuit 32 and back to the input terminal 14. In a like manner, when a negative low voltage is applied across the terminals 12 and 14 via the power source 11, positive current flows from the input terminal 14, through the triac circuit, capacitor 28, diode 22 and back to input terminal 12. Thus, the peak voltage of the source 11 appears across each of the capacitors 26 and 28 and adds to form a doubled voltage output.

From the foregoing, those skilled in the art will understand that there is no need for the inrush limiting device 30 to be rated for continuous operation at the input current appropriate to low voltage operation since it is not in circuit under steady state operating conditions.

3. Power Down Condition

In a power down mode of operation, the inrush-limiting device 30 has no function. In this regard, at power down, the triac circuit 32 is turned off or reset, such that the inrush limiting device 30 is available for current limiting the very next time power is applied to the power supply 10. This is facilitated as the triac circuit 32 which includes a triac 40 and a conventional, well known, drive circuit 42 is derived from the AC input.

In summary then, after a power down condition, the inrush-limiting device 30 is made immediately available in circuit when power is restored, without any substantial degradation in performance irrespective of the applied voltage history. In this regard, as discussed hereinafter in greater detail, the inrush limiting device 30 in the preferred embodiment of the present invention, is a simple resistor that is not as sensitive to temperature changes as other types of inrush limiting devices, such as a thermistor. Thus, in the absence of any substantial temperature dependence, the resistor 30 yields more predictable or consistent linear characterizations.

B. High Voltage Mode of Operation

1. Initial Power on Condition

Considering now the high voltage mode of operation of the power supply 10 in greater detail with reference to FIGS. 1 and 2, when high voltage is initially applied across the input terminals 12 and 14 via a power source 11 at between about 180 $VAC_{rms}$ and about 264 $VAC_{rms}$, the triac circuit 32 is inactive and acts as an open circuit. In this regard, when a positive voltage is applied to terminal 12, current flow traverses diode 18, capacitor 26 and capacitor 28 in series, diode 20, and inrush limiting device 30 and back to terminal 14.

With reverse polarity in the high voltage mode, current flow is from the input terminal 14,to the inrush limiting device 30, diode 24, capacitors 26 and 28 in series, diode 22 and back to input terminal 12. Thus, the voltage across the capacitors 26 and 28 is the peak of the AC voltage applied to the input terminals 12 and 14, which is between about 180 $VAC_{rms}$ and about 264 $VAC_{rms}$.

2. Steady State High Voltage Operation

Considering now the steady state operation of the power supply 10 in the high voltage mode of operation with reference to FIGS. 1 and 2, at the end of the first full AC line voltage cycle, the voltage across capacitors 26 and 28 in series is sufficiently high to prevent the triac circuit 32 from switching between its normally open circuit mode of operation and its short circuited mode of operation. In this regard, the triac circuit 32 senses the sum total voltage stored across the capacators 26 and 28 in series to inhibit switching. Accordingly, the triac circuit 32 is not activated and continues to function as an open circuit. Thus, there is no difference between the power up and the steady state conditions. In both situations, the inrush-limiting device 30 is always in circuit. Based on the foregoing, those skilled in the art will understand that the inrush limiting device 30 may be: 1) rated for lower current flow in the high voltage mode of operation; and 2) valued to assist in substantially reducing harmonic power dissipation as required by IEC standards.

3. Power Down Condition

In a power down mode of operation, the inrush-limiting device 30 has no function. In this regard, at power down, the triac circuit 32 remains off or reset, such that the inrush-limiting device 30 is always available for current limiting the very next time power is applied to the power supply 10. This is facilitated because drive circuitry 42 for the triac 40 is derived from the AC input.

C. Power Supply Features

Based on the foregoing, the power supply 10 exhibits several unique and highly desirable features summarized as follows:

1) Increased efficiency under low voltage operating conditions since there is no power loss associated with the inrush limiting device 30 under steady state input conditions;

2) Increased reliability since under low voltage operating conditions the inrush limiting device 30 is only dissipating power during power start up conditions and then only for a predetermined period of time that optimizes the dissipation of surge currents during power up cycles;

3) Reduced cost as the inrush limiting device 30 can be rated for continuous operation only at high input voltage levels when the input current is lowest and the device power dissipation is least;

4) Reduced operating temperatures since the temperature rise in the vicinity of the inrush limiting device 30 may be significantly reduced when compared to a thermistor;

5) Increased reliability relative to in-line limiting device circuits having one or more thermistors;

6) Improved inrush limiting during short successive duration power interrupts; and 7) Reduced output voltage chatter at low ambient temperatures during start up since the inrush-limiting device may be less sensitive to low ambient temperature conditions.

D. Operating Characteristics

Considering now the inrush limiting device 30 in greater detail with reference to FIG. 1, the inrush limiting device 30 is always in the current path initially at the application of power and limits the instantaneous input current. However, the triac circuit 32 bypasses the inrush limiting device 30 after a suitable delay if the voltage of the source 11 is a low voltage of between about 85 $VAC_{rms}$ and about 140 $VAC_{rms}$. As a consequence, the inrush current limiting is available at all times, but for low voltage operations, the steady state current does not flow through the inrush-limiting device 30. At the end of the above mentioned suitable delay period, which is at least about one full AC cycle, the triac switching circuit 32 is activated under the controlled condition when the AC line voltage is at about zero volts of the applied voltage, thus substantially eliminating or at least greatly reducing the "second" inrush or capacitor charging current.

Although in the above described operation, a preferred delay time of at least one full AC cycle is described, it will be understood by those skilled in the art, that based on the circuit application of the power supply converter 10, other delay times may be preferred.

Moreover, although in the above-described operation, a preferred controlled condition is indicated to be at about zero volts of the applied voltage, there is not intention of limiting the condition to this precise voltage. In this regard, while the most preferred AC line voltage value at time of switching is about 0 volts, it should be understood that the AC line voltage can be between about 0 volts and about 50% of the peak applied voltage relative to the low voltage mode of operation and the high voltage mode of operation respectively.

In order to facilitate a better understanding of the function of the current limiting device 30 under steady state operating conditions, the following numerical example is provided:

The resistance value of the current limiting device 30 is selected on an application by application basis. Thus, for example, assuming a power supply with the properties shown in Table 1 and an AC voltage source of $180V_{rms}$, the following can be derived:

I=250VA/180V≈1.4 Amps

Then if the inrush current limiting device 30 is selected to have a value of 3.0 ohms power is derived:

Power=$I^2R$=$(1.4)^2(3.0)$=5.9 Watts

If the current limiting device 30 were in circuit when the AC voltage source is 85 $V_{rms}$, the following can be derived:

I=250VA/85V≈3.0 Amps and

Power=$I^2R$=$(3.0)^2(3.0)$=27.0 Watts

From the foregoing it can be understood by those skilled in the art why thermistors are utilized as a current limiting device. In this regard, a thermistor will absorb electrical energy and heat up with I at 3.0 amps. As the thermistor absorbs electrical energy its resistive value drops, for example, to 0.7 ohms; thus yielding a power dissipation of:

P=$(3.0)^2(0.7)$=6.3 Watts

Unfortunately, such a thermistor absorbs the electrical energy continuously (e.g. it remains thermally hot) and thus, during short interval power interrupts of the AC input, the thermistor is ineffective as noted by the following:

$I_{inrush}$=264V/0.7 ohms=377 Amps

Thus, when compared to an 88 amp inrush current when the three ohms resistor is employed as in this example.

In the preferred embodiment of the present invention, there is no current flow into the current limiting device 30 under steady state low voltage conditions and therefore the device 30 may be sized considering only the high input voltage case. In short then, the foregoing example illustrates a case in which an inexpensive 3 Ohm, 6 Watt resistor can be utilized in place of an expensive thermistor, while facilitating a significant contribution to the reduction of input current harmonics and flicker.

Although a resistor is preferred, those skilled in the art will understand that other current limiting devices may also be employed, such as an NTC thermistor and the like. In this regard, when the source 11 provides a high voltage, the input current is lowest or minimal, and thus, the power dissipated by the inrush limiting device 30 is also minimized providing less heat and power dissipation for improved power supply performance.

TABLE 1

| Input Power | 150 Watts |
|---|---|
| Output Power | 120 Watts Avg. |
| Power Factor | 0.6 |
| Input VA | 150/0.6 = 250 VA |

While particular embodiments of the present invention have been disclosed, it is to be understood that various different modifications are possible and are contemplated within the true spirit and scope of the appended claims. Therefore, there is no intention of limitations to the exact abstract or disclosure herein presented.

We claim:

1. In power supply converter having a pair of AC input terminals for connection to an AC power source having a corresponding pair of AC output terminals for facilitating the coupling an available line voltage to a pair of series connected capacitors interconnected via a common node, and a rectifier having one pair of nodes to facilitate the further coupling of the available line voltage to the series connected capacitors and another pair of nodes coupled to the pair of AC input terminals to facilitate AC voltage conversion, a surge protection arrangement comprising:

an auto ranging circuit coupled between one of the AC input terminals and the common node for sensing the total sum voltage across the capacitors and for switching between a normally open circuit condition and a short circuit condition when the capacitors are charged to a desired low voltage potential level for a predetermined period of time and for remaining an open circuit when the capacitors are charged to a desired high voltage potential level for said predetermined period of time; and an inrush current limiting device coupled between one of the AC input terminals and an individual one of another pair of nodes for limiting inrush current when said auto ranging circuit functions as an open circuit and for not limiting inrush current when said auto ranging circuit functions as a short circuit.

2. A surge protection arrangement according to claim 1, further comprising:

an AC power conductor coupled between a power output terminal of the AC voltage source and one of the AC input terminals to facilitate the coupling of the AC power source to the capacitors; and another AC power conductor coupled between another power output terminal of the AC voltage source and the other one of the AC input terminals to further facilitate the coupling of the AC power source to the capacitors.

3. A surge protection arrangement according to claim 1, wherein said inrush current limiting device is a resistor.

4. A surge protection arrangement according to claim 1, wherein the available line voltage supplied from the AC power source is a low voltage between about 85 $VAC_{rms}$ and about 140 $VAC_{rms}$.

5. A surge protection arrangement according to claim 1, wherein the available line voltage supplied from the AC power source is a high voltage between about 180 $VAC_{rms}$ and about 264 $VAC_{rms}$.

6. A surge protection arrangement according to claim 2, wherein the inrush current limiting device is a resistor.

7. A surge protection arrangement according to claim 1, wherein the auto ranging circuit is a triac switching circuit.

8. A surge protection arrangement according to claim 7, wherein said triac switching circuit includes a triac.

9. A surge protection arrangement according to claim 1, wherein said predetermined period of time is at least one AC voltage cycle.

10. A power supply according to claim 6, wherein said resistor helps to substantially eliminate output voltage chatter during the initial application of power to said capacitors.

11. A surge protection arrangement according to claim 9, wherein said auto ranging circuit switches between an open circuit and a short circuit when the AC line voltage is transitioning from a negative potential to a positive potential or a positive potential to a negative potential at about zero volts.

12. A power supply having an AC line input terminal and a AC neutral input terminal for connection to an AC power source, comprising:

a pair of series connected capacitors for maintaining a predetermined charge, said series connected capacitors being interconnected via a common node;

a rectifier having a line potential node, a neutral potential node, and a pair of internal nodes to facilitate the coupling of the AC power source to said capacitors;

said line node being coupled to the AC line power terminal, and said pair of internal nodes being coupled between said pair of series connected capacitors;

a switching circuit coupled between said common node and the AC neutral input terminal;

said switching circuit in a low voltage mode of operation being a normally open circuit when not energized with low voltage from the AC power source and a short circuit when energized for a predetermined period of time with low voltage from the AC power source;

said switching circuit in a high voltage mode of operation being a normally open circuit when not energized with high voltage from the AC power source and remaining an open circuit when energized for said predetermined period of time with high voltage from the AC power source; and an inrush current limiting device coupled between the AC neutral input terminal and the neutral potential node of said rectifier for limiting inrush current when low voltage AC power is coupled to said capacitors for said predetermined period of time and for dissipating no power when said switching circuit responds to the low voltage AC power and switches to said short circuit.

13. A method of limiting inrush current, comprising:
   limiting inrush current for a predetermined period of time during a power up condition with an inrush current limiting device; and
   bypassing said inrush current limiting device after said predetermined period of time so that the inrush current limiting device dissipates substantially no power under steady state operating conditions.

14. A method according to claim 13, further comprising:
   switching in circuit said inrush current limiting device in response to an interruption in the steady state operating conditions to facilitate limiting inrush current when power is reapplied and inrush current flows to said inrush current limiting device.

15. A method according to claim 13, wherein said predetermined period of time is at least one AC voltage cycle.

16. A method according to claim 13, wherein said predetermined period of time coincides when the AC voltage of an applied AC power source to said inrush current limiting device is transitioning between positive and negative voltages.

17. A method according to claim 16, wherein the step of bypassing includes:
   substantially eliminating output voltage chatter.

18. A circuit for limiting inrush current in a rectifier power supply having a pair of series connected capacitors for holding a sufficient charge to provide a load voltage of a desired potential and a diode rectifier having a input line potential terminal and an input neutral potential terminal for coupling an AC line voltage source to the capacitors to enable them to be charged to the desired potential in response to the AC line voltage being applied across an AC line input terminal and an AC neutral input terminal of the power supply, comprising:
   unlimited AC line voltage coupling means connected between the AC line input terminal and the line input terminal of the bride diode for providing the diode rectifier with positive current during positive line voltage cycles;
   unlimited AC neutral coupling means connected between the series connected capacitors and the AC neutral input terminal for switching automatically after a predetermined period of time between an open circuit condition and a short circuit condition in response to an initially applied AC line voltage of between about 85 $VAC_{rms}$ and about 140 $VAC_{rms}$ and for not switching between an open circuit condition and a short circuit condition in response to an applied AC line voltage of between about 180 $VAC_{rms}$ and 264 $VAC_{rms}$; and
   inrush current limiting means coupled between the neutral input terminal of the diode rectifier and the AC neutral input terminal and responsive to said switching means for limiting inrush surge current for said predetermined period of time when an AC line voltage of between about 85 $VAC_{rms}$ and about 140 $VAC_{rms}$ is initially applied across the positive and negative line voltage terminals and for dissipating no power after said predetermined period of time when the applied AC line voltage is between about 85 $VAC_{rms}$ and about 140 $VAC_{rms}$ to enable said inrush current limiting means to respond to subsequent power interrupt conditions without any substantial degradation in current limiting performance regardless of the time duration between individual power interrupts.

19. A circuit for limiting inrush current according to claim 18, wherein said inrush current limiting means limits inrush surge current continuously when an AC line voltage of between about 180 $VAC_{rms}$ and about 264 $VAC_{rms}$ is initially applied across the positive and negative line voltage terminals to facilitate rating said inrush current limiting means for continuous operation when the applied AC line voltage is between about 180 $VAC_{rms}$ and about 264 $VAC_{rms}$ and not between about 85 $VAC_{rms}$ and about 140 $VAC_{rms}$.

20. A power converter having a pair of internal power terminals is responsive to an AC power source having a pair of corresponding power output terminals and includes a pair of capacitors interconnected in series via a common node and a rectifier for directing rectified electrical current derived from the AC power source to the capacitors so they are charged to a desired voltage potential, comprising:
   a power conductor for directly connecting one of the internal power terminals to one of the AC power source output terminals;
   another power conductor for directly connecting the other one of the internal power terminals to the other one of the AC power source output terminals and a power terminal of the rectifier;
   a switching circuit coupled between the common mode and the one of the internal power terminals senses the total voltage across the capacitors for switching between a normally open circuit and a switched short circuit when the capacitors are energized with a desired low voltage from the AC power source for a predetermined period of time and for remaining an open circuit when the capacitors are energized with a desired high voltage from the AC power source for said predetermined period of time;
   an inrush current limiting device coupled between another power terminal of the rectifier and the one of the internal power terminals for limiting inrush current when said switching circuit functions as an open circuit and for not limiting inrush current when said switching circuit functions as a short circuit; and
   said inrush current limiting device limiting inrush current only for said predetermined period of time when the AC power source provides said desired low voltage under low voltage operating conditions and always limiting harmonic input current and flicker when the AC power source provides said desired high voltage under high voltage operating conditions.

21. A method of limiting inrush current under low voltage operating conditions and limiting harmonic input current and flicker under high voltage operating conditions, comprising:
   applying an AC voltage converter having a pair of series connected capacitors;
   sensing the total sum voltage across said pair of series connected capacitors;
   limiting inrush current via an inrush current device when the sensed total sum voltage across said pair of series connected capacitors is a low voltage for a predetermined period of time;
   bypassing said inrush current device after said predetermined period of time when the sensed total sum voltage across said pair of series connected capacitors is said low voltage; and
   inhibiting the bypassing of said inrush current limiting device when the sensed total sum voltage across said pair of series connected capacitors is a high voltage for said predetermined period of time to effectively limit input harmonic current sand flicker; and
   continuing to inhibit the bypassing of said inrush current limiting device after said predetermined period of time when the sensed total sum voltage across said pair of series connected capacitors is said high voltage.

* * * * *